United States Patent
Kawashima et al.

(10) Patent No.: US 9,091,605 B2
(45) Date of Patent: Jul. 28, 2015

(54) FORCE CALCULATING SYSTEM

(75) Inventors: Kenji Kawashima, Tokyo (JP); Kotaro Tadano, Tokyo (JP); Daisuke Haraguchi, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 49 days.

(21) Appl. No.: 14/114,071

(22) PCT Filed: Apr. 20, 2012

(86) PCT No.: PCT/JP2012/060731
§ 371 (c)(1),
(2), (4) Date: Oct. 25, 2013

(87) PCT Pub. No.: WO2012/147655
PCT Pub. Date: Nov. 1, 2012

(65) Prior Publication Data
US 2014/0047929 A1    Feb. 20, 2014

(30) Foreign Application Priority Data

Apr. 26, 2011 (JP) .................................. 2011-098178

(51) Int. Cl.
*G01L 1/04* (2006.01)
*G01L 1/02* (2006.01)
(Continued)

(52) U.S. Cl.
CPC . *G01L 1/02* (2013.01); *G01F 1/206* (2013.01); *G01F 1/28* (2013.01); *G01L 1/042* (2013.01)

(58) Field of Classification Search
CPC ............. G01L 1/04; G01L 1/02; G01F 1/206; G01F 1/28
See application file for complete search history.

(56) References Cited

U.S. PATENT DOCUMENTS 3,834,224 A    9/1974 Uchida et al.
5,515,164 A *  5/1996 Kreikebaum et al. ........ 356/339
(Continued)

FOREIGN PATENT DOCUMENTS

FR    2681135 A1    3/1993
JP    55-106329 A    8/1980
(Continued)

OTHER PUBLICATIONS

Office Action for Japanese patent application No. 2011-098178, mailed Nov. 25, 2014.
(Continued)

*Primary Examiner* — Max Noori
(74) *Attorney, Agent, or Firm* — Capitol City TechLaw, PLLC; Richard C. Irving

(57) ABSTRACT

The force calculation system of the present invention is provided with: an air blowing unit for blowing air at a predetermined pressure; a flow passage for air blown from air blowing unit; a sensing unit for changing the ease of flow of air that flows through a flow passage by deforming when an external force is given; a storage unit for storing in advance the flow volume-force correspondence information showing the correspondence between the magnitude of the force received by the sensing unit and the flow volume at which air blown from air blowing unit flows through the flow passage; and a processing unit for calculating the magnitude of external force received by the sensing unit, on the basis of: the flow volume of air flowing through the flow passage as measured by a flow volume meter; and the flow volume-force correspondence information stored in the storage unit.

3 Claims, 7 Drawing Sheets

Figure 1:
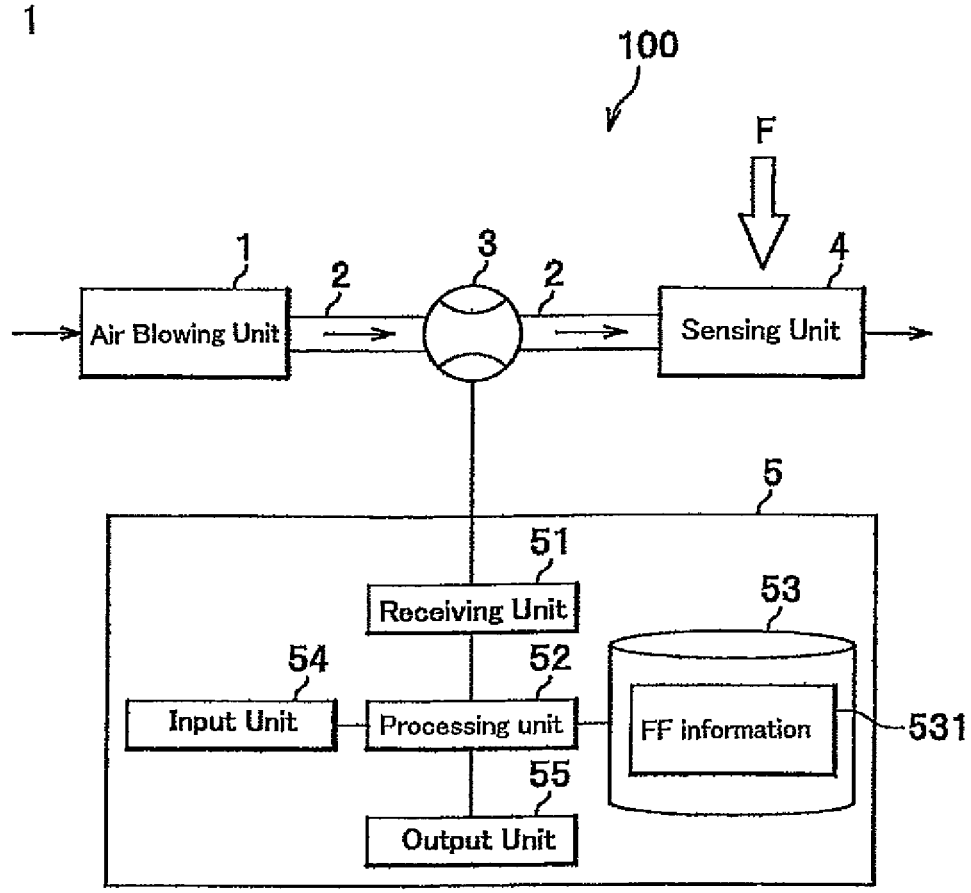

(51) Int. Cl.
*G01F 1/20* (2006.01)
*G01F 1/28* (2006.01)

(56) References Cited

U.S. PATENT DOCUMENTS

| | | | |
|---|---|---|---|
| 6,253,625 | B1* | 7/2001 | Samuelson et al. ........ 73/861.71 |
| 2003/0205079 | A1* | 11/2003 | Taylor ........................ 73/64.48 |
| 2004/0219875 | A1* | 11/2004 | Mills ............................ 454/256 |
| 2006/0162728 | A1* | 7/2006 | Delache et al. .......... 128/204.22 |
| 2013/0014591 | A1* | 1/2013 | Fernandes et al. ......... 73/861.24 |

FOREIGN PATENT DOCUMENTS

| | | |
|---|---|---|
| JP | S60-56208 U | 4/1985 |
| JP | 61-7431 | 1/1986 |
| JP | 2003-284699 A | 10/2003 |
| JP | 2009-276171 A | 11/2009 |

OTHER PUBLICATIONS

Peirs, J, et al., "A micro optical force sensor for force feedback during minimally invasive robotic surgery." Sensors and Actuators A, vol. 115, pp. 447-455, Jul. 24, 2004, Elsevier B.V.

Polygerinos, P., et al., "A fibre-optic catheter-tip force sensor with MFI compatibility: a feasibility study," 31st Annual International Conference of the IEEE EMBS, Minneapolis, MN, US, Sep. 2-6, 2009, pp. 1501-1504—Abstract Only.

European Patent Office Extended Search Report for corresponding European Patent Application No. 12777692.0-1557, issued Dec. 18, 2014.

\* cited by examiner

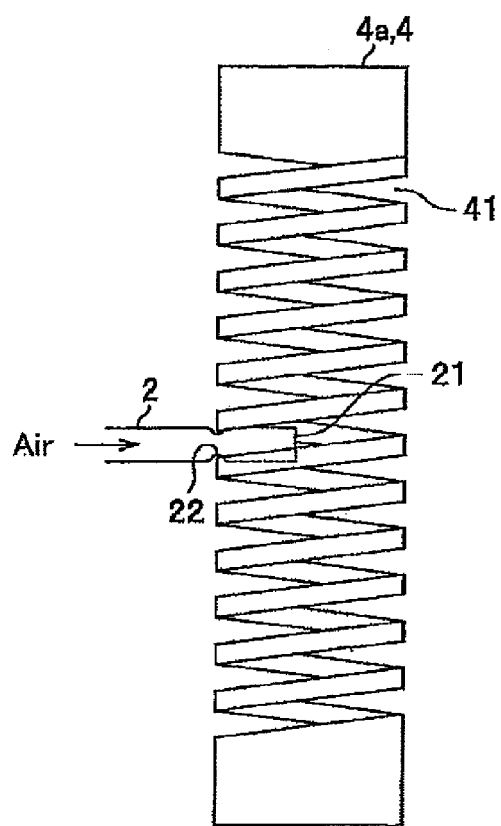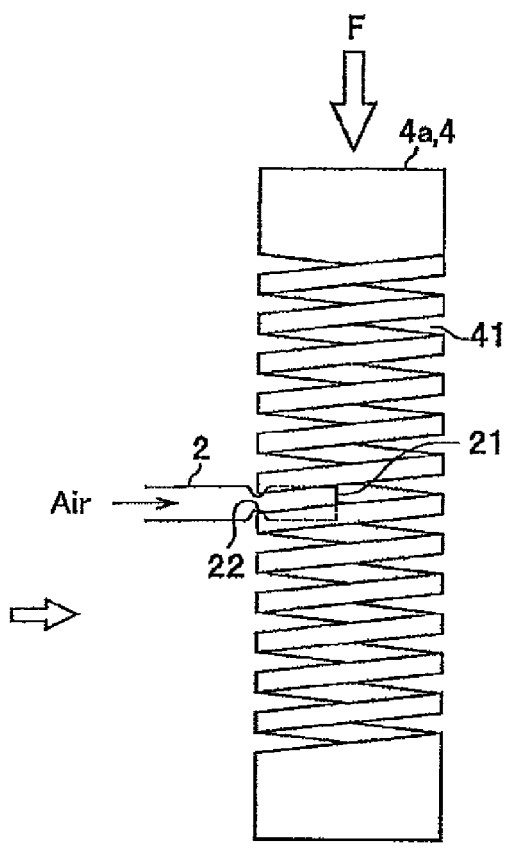

FORCE CALCULATING SYSTEM

FIELD OF THE INVENTION

This invention relates to technology of a force calculation system, which is able to calculate the strength of force applied to a target area without an electrical device.

DESCRIPTION OF THE RELATED ART

Some of conventional methods of measuring force are widely used, for example, a strain gauge method using a variation of an electrical resistance (hereinafter electrical strain sensor), or a load cell method with a sensing unit equipped with a piezoelectric element. However, these methods cannot be used in strong electromagnetic environment such as a MRI (Magnetic Resonance Imaging) device, since these sensors must use electrical phenomena. In addition, there is a risk of a problem with the measurement accuracy decreasing due to interference with another electrical device.

Thus, a light fiber type strain gauge (hereinafter, light fiber type sensor) has already put into practical use (see non-patent documents No. 1 and 2). This technology has no problem to be caused by electrical phenomena as above, because it detects variations due to strain of a sensing unit, e.g., a wavelength, frequency, phase, and percolation of the light.

Non-patent documents

Non-patent document No. 1: J. Peirs, et al., "A micro optical force sensor for force feedback during minimally invasive robotic surgery", Sensors and Actuators A 115 (2004), pp. 447-455.

Non-patent document No. 2: P. Polygerinos, et al., "A Fibre-Optic Catheter-Tip Force Sensor with MRI Compatibility: A Feasibility Study", 31st Annual International Conference of the IEEE EMBS Minneapolis, Minn., USA, Sep. 2-6, 2009, pp. 1501-1504.

SUMMARY OF THE INVENTION

Problems to be Solved by the Invention

However, an optical switch acting as an optical source and a signal conditioner for signal processing are required for the above light fiber type sensor. Therefore the whole system is more expensive and larger than the system of the electrical strain sensor.

Thus, in view of the above-mentioned situation, problems to be solved by this invention is to provide an undersized and inexpensive force calculation system, which is able to calculate the strength of force applied to a target area without an electrical device.

Means for Solving the Problem

To solve the above problem, a force calculation system comprises an air blowing unit for blowing air at a predetermined pressure, a flow passage connected to the air blowing unit for blowing air, a sensing unit arranged in the end portion of the flow passage on the side opposite to the air blowing unit wherein the ease of flow of air is changed by deformation due to external force, a flowmeter measuring flow volume of air flowing through the flow passage, a memory unit for storing in advance information of correspondence relation between the strength of external force at the sensing unit and the flow volume of air flowing through the flow passage from the air blowing unit, and a processing unit for calculating the strength of the external force applied to the sensing unit based on the flow volume of air flowing through the flow passage as measured by the flowmeter and the information of the correspondence relation stored by the memory unit, wherein the sensing unit comprises an aperture tucking the flow passage down, the aperture is made of a member which makes a width of the aperture change as a function of the external force, the end portion of the flow passage on the side opposite to the air blowing unit is connected to the aperture of the member, and the flow volume of air flowing the tube is changed by a variation of the width of the aperture due to the external force applied to the sensing unit.

Effects of the Invention

According to the present invention, it is possible to provide an undersized and inexpensive force calculation system, which is able to calculate the strength of force applied to a target area without an electrical device.

BRIEF DESCRIPTION OF INVENTION

FIG. 1 shows a schematic diagram of an embodiment of the force calculation system.

FIGS. 2A and 2B show a structure of the tucked tube type sensing unit. FIG. 2A shows the structure before the external force is applied to the sensing unit. FIG. 2B shows the structure after the external force has been applied to the sensing unit.

Figure 3A:
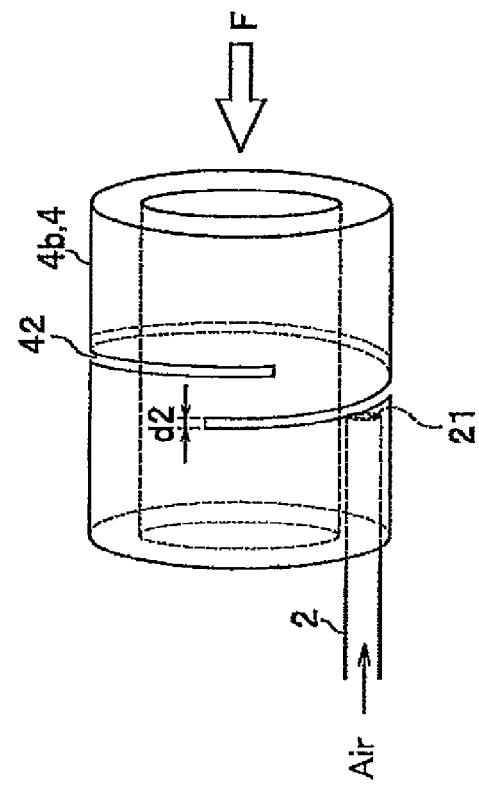
Figure 3B:
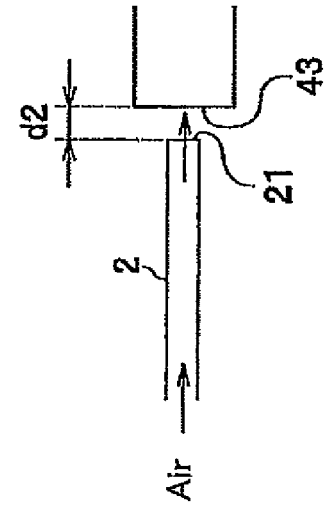
Figure 3C:
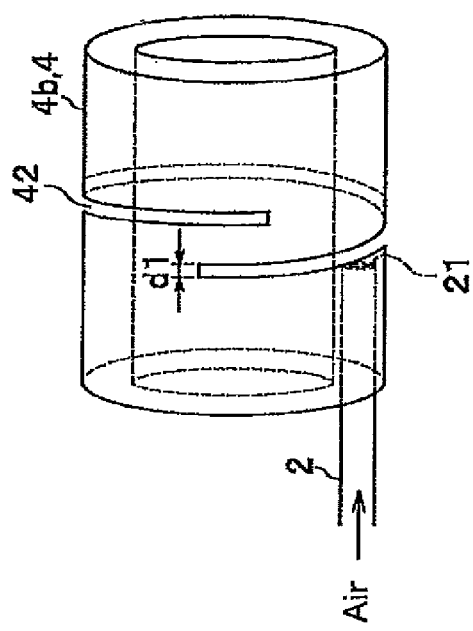
Figure 3D:
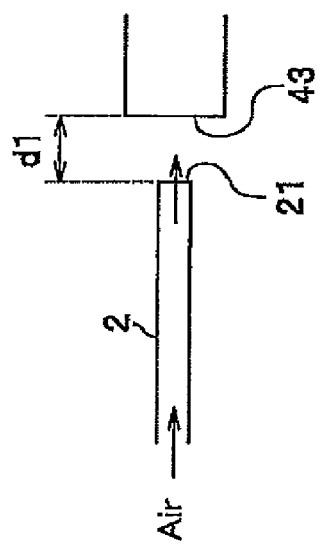

FIGS. 3A-3D show a structure of the slit type sensing unit. FIGS. 3A and 3B show the structure before the external force is applied to the sensing unit. FIGS. 3C and 3D show the structure after the external force has been applied to the sensing unit.

Figure 4A:
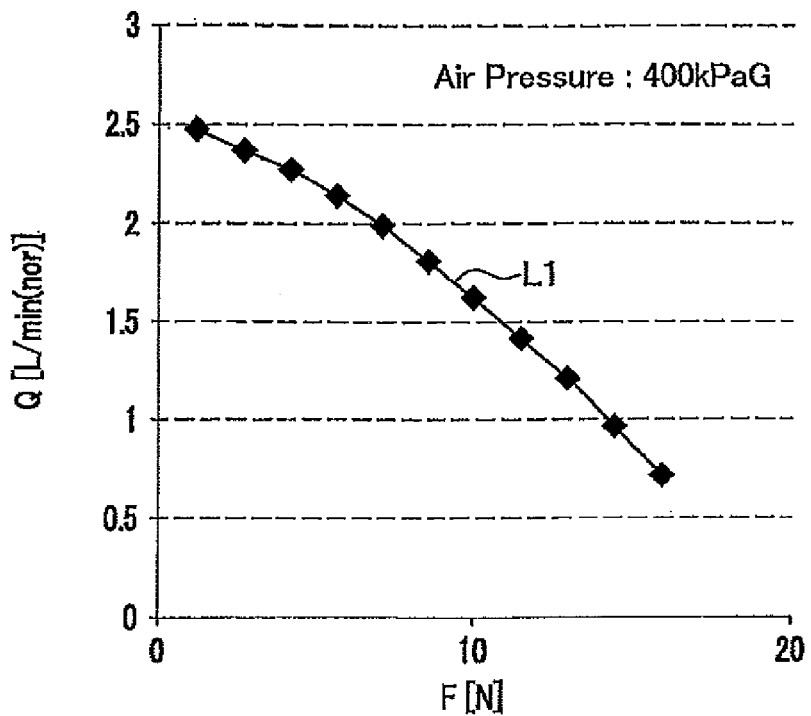
Figure 4B:
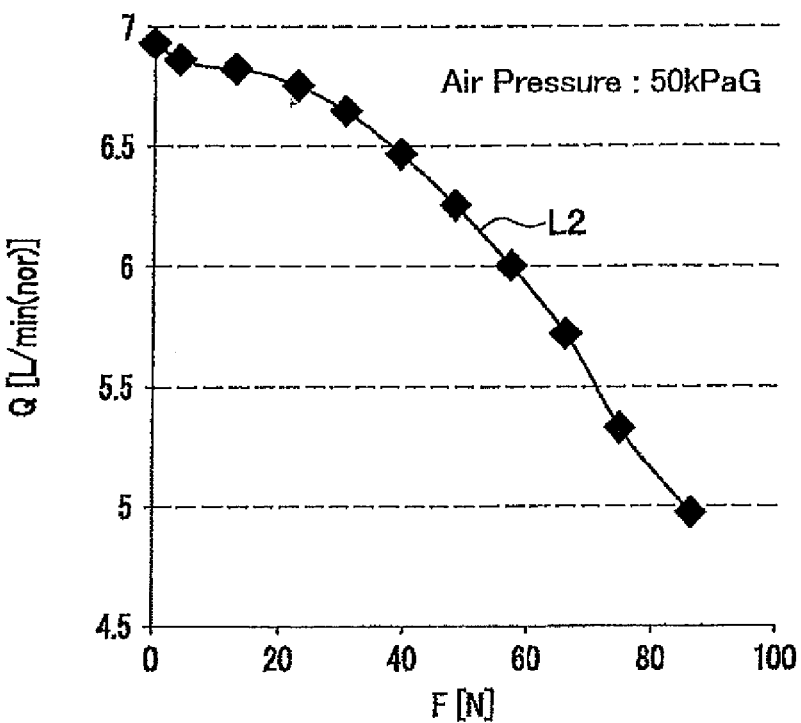

FIGS. 4A and 4B show relationship between the external force applied to the sensing unit and the flow volume of air flowing through the flow passage. FIG. 4A shows a sample of the relationship using the tucked tube type sensing unit. FIG. 4B shows a sample of the relationship using the slit type sensing unit.

Figure 5A:
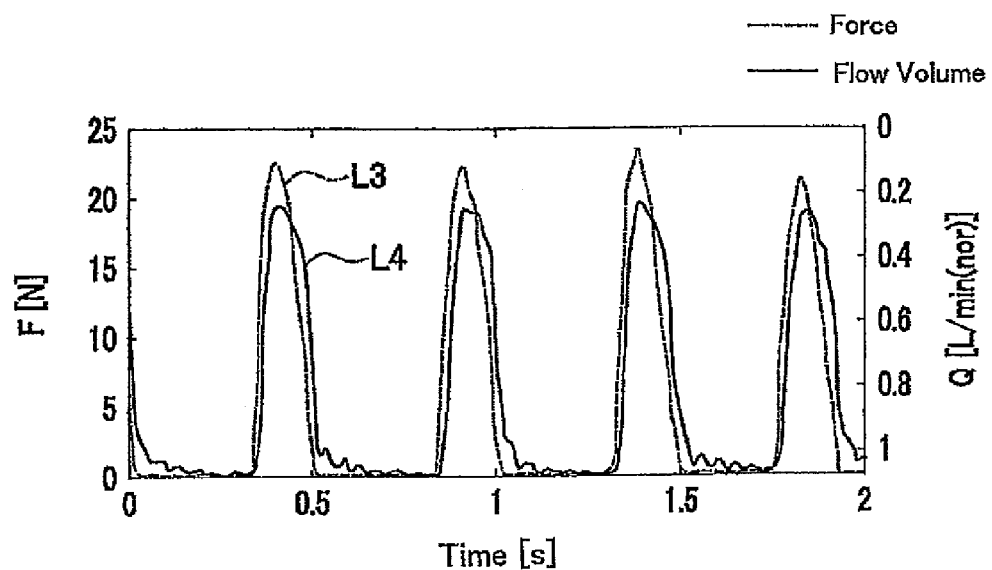
Figure 5B:
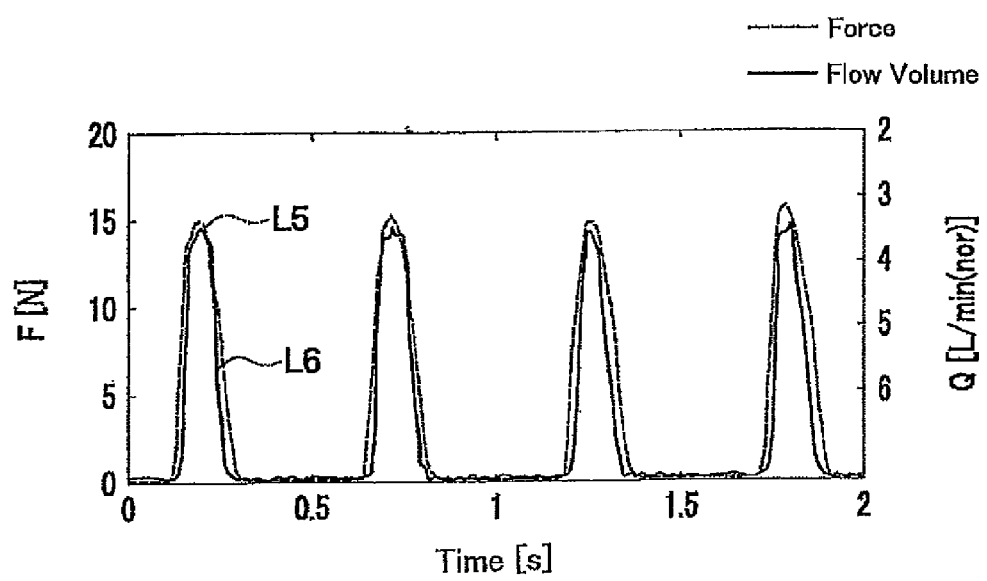

FIGS. 5A and 5B show dynamic characteristics between the external force applied to the sensing unit and the flow volume of air flowing through the flow passage. FIG. 5A shows a sample of the relationship using the tucked tube type sensing unit. FIG. 5B shows a sample of the relationship using the slit type sensing unit.

Figure 6:
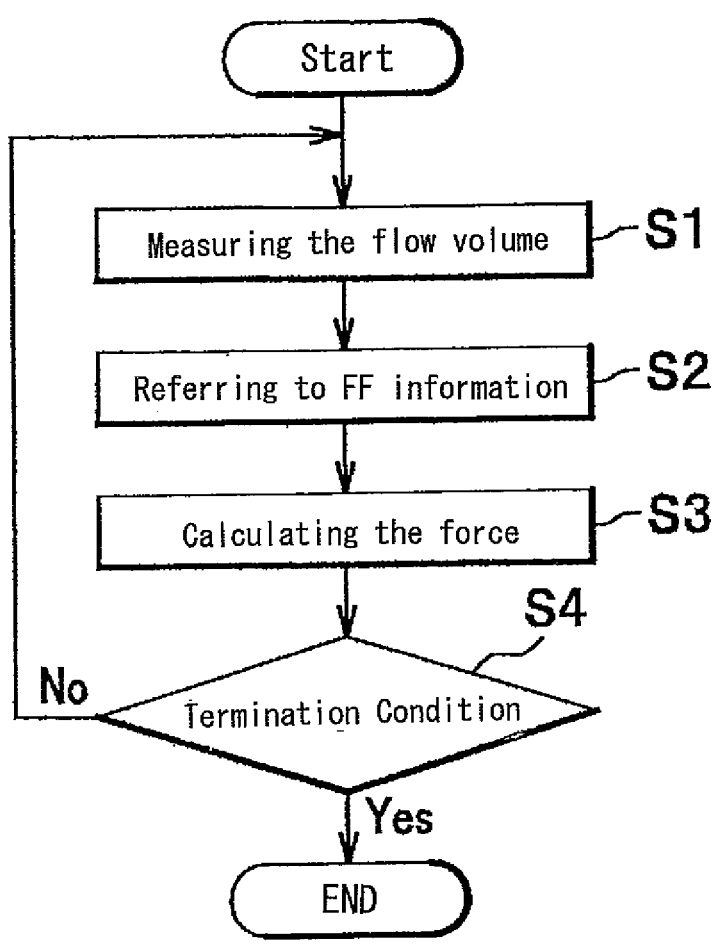

FIG. 6 shows flowchart of processing flows in the processing unit of the computing device.

Figure 7A:
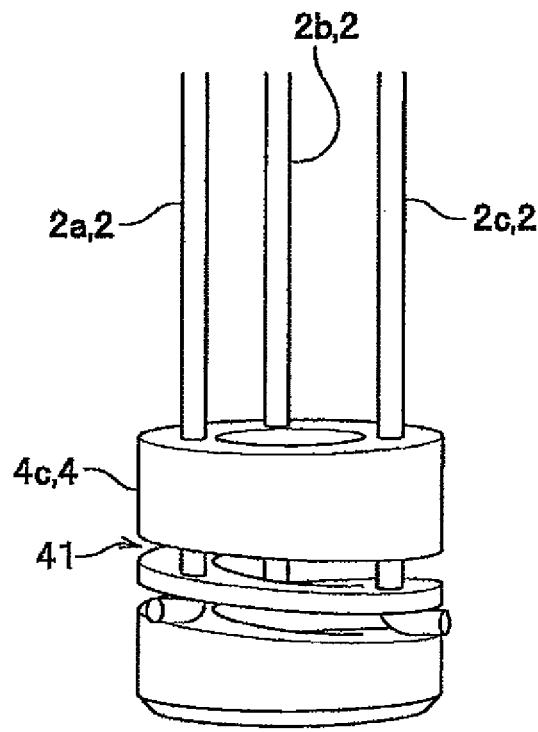
Figure 7B:
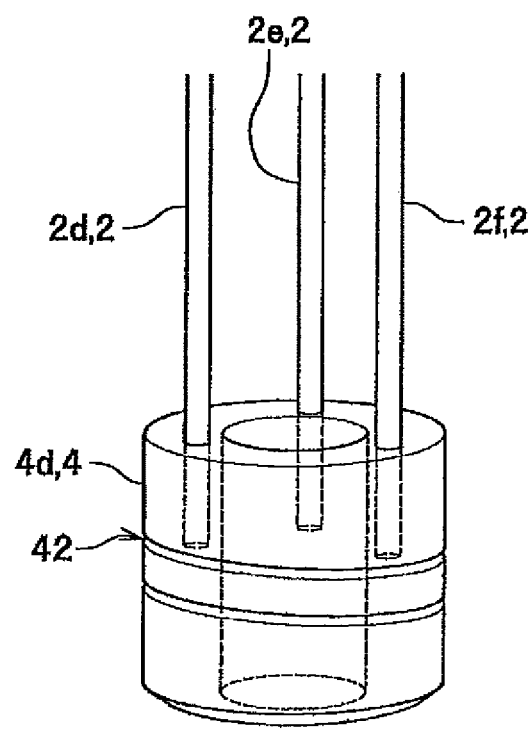

FIGS. 7A and 7B show structures of flow passages and the sensing unit in the case of having three flow passages. FIG. 7A shows a sample of the structure using the tucked tube type sensing unit. FIG. 7B shows a sample of the structure using the slit type sensing unit.

DETAILED DESCRIPTION OF THE INVENTION

A force calculation system according to an embodiment of the present invention will be described in detail with reference to the drawings. In addition, for example, this embodiment assumes that a force calculation system 100 is used when it is necessary to obtain the strength of force such as weft tension in suturing or elasticity from internal organs to a crow-bill due to using an endoscopic operation robot.

As shown in FIG. 1, a force calculation system comprises an air blowing unit 1, a flow passage 2, a flowmeter 3, a sensing unit 4, and a processing unit 5. The air blowing unit 1 is a device for blowing out air at a predetermined pressure. For example, the air blowing unit 1 may be implemented by a combination of a compressor and a regulator valve. The flow passage 2 through which air flows from the air blowing unit 1 is connected to the air blowing unit 1. For example, the flow passage 2 may be implemented by a plastic tube.

In addition, hereinafter one end of the flow passage 2 on the side of the sensing unit 4 is called "leading end", the other end of the side of the air blowing unit 1 is called "base end."

The flowmeter 3 is a device for measuring the flow volume of air flowing through the flow passage. For example, the flowmeter 3 may be implemented by a laminar flow type flowmeter, which comprises a laminar flow element and a sensor measuring a differential pressure between both ends. The sensing unit 4 is disposed at the end of the flow passage 2, and is deformed by the external force. The sensing unit 4 changes the ease of flow of air flowing through the flow passage 2 by deforming when the external force is applied to the sensing unit 4, to be discussed in detail below.

The computing device 5 is a computer device comprising a receiving unit 51, a processing unit 52, a memory unit 53, an input unit 54, and an output unit 55. The receiving unit 51 is a device for receiving measurement data of the flow volume from the flowmeter 3. For example, the computing device 5 may be implemented by an application specific integrated circuit.

The processing unit 52 is a device for processing a variety of operations. For example, the processing unit 52 may be implemented by a central processing unit (CPU). Based on the measurement data of the flow volume of air flowing through the flow passage 2 and flow-volume-force correspondence relation information 531 stored in the memory unit 53, the processing unit 52 calculates the strength of external force applied to the sensing unit 4, to be discussed in detail below.

The memory unit 53 is a device for storing information. For example, the memory unit 53 may be implemented by a memory device such as a RAM (random access memory), a ROM (read only memory), or a HDD (hard disk drive) etc. The memory unit 53 stores the flow-volume-force correspondence relation information 531 between the external force applied to the sensing unit 4 and the flow volume of air which is blown out the air blowing unit and flows through the flow passage 2.

More specifically, the flow-volume-force correspondence relation information 531 denotes data information shown in graphs of FIGS. 4A and 4B.

The input unit 54 is a device for a user of computing device 5 to input information. For example, the input unit 54 may be implemented by a keyboard or a mouse.

The output unit 55 is a device for outputting information. For example, the output unit 55 may be implemented by a device such as an external communication interface or a liquid crystal display (LCD) etc.

Next, the sensing unit 4 is explained. In this embodiment, for example, two types of sensing units may be explained. One is a tucked tube type, and the other is a slit type.

Firstly, the tucked tube type sensing unit 4a is explained.

FIG. 2A shows the tucked tube type sensing unit 4a made of stainless steel, and the sensing unit 4a may be implemented using coil spring where the middle part of a cylindrical body is formed into a coiled shape. The aperture 41 of the sensing unit 4a tucks the middle portion 22 near the end portion 21.

In addition, it is necessary that the flow passage 2 is elastically deformable tube. Furthermore, for example, the sensing unit 4a has a diameter of 5 mm and an axial length of about 20 mm.

FIG. 2B shows an aperture 41 of which a width is changed when the external force is applied to the sensing unit 4 in an axial direction. Thus the flow volume of air flowing through the flow passage 2 is changed, since an effective section area in the middle portion 22 is changed by a variation of the width of an aperture 41. Here the effective section area means section area in the direction vertical to air flow passing direction. In addition, the end portion 21 is pressured at the atmospheric pressure.

Secondly, the tucked tube type sensing unit 4b is explained.

FIG. 3A shows the sensing unit 4b made of a cylindrical aluminum material. The sensing unit 4b has a slit 42 of which an opening width is changed when the external force is applied to the sensing unit 4 in an axial direction (a determined direction). In addition, a hole is bored in a part of a sidewall of the sensing unit 4b so that the end portion 21 of the flow passage 2 is put in the sensing unit 4b. Thus the end portion 21 of the flow passage 2 is arranged at the slit 42.

In addition, it is not necessary that the flow passage 2 is made of an elastically deformable material. Furthermore, for example, the sensing unit 4b has a diameter of 10 mm and an axial length of about 15 mm.

In this case, as shown in FIG. 3B, a leading end 21 of flow passage 2 and a facing plane 43 are placed from each other by a distance of dl, i.e., a width of a slit 42.

FIG. 3C shows the flow passage 2 through which the flow volume of air is changed, since a distance between a leading end 21 of the flow passage 2 and a facing plane 43 is changed by a variation of a width of a slit 42, when the external force is applied to the sensing unit 4a (see FIG. 3D).

In addition, the longer distance between a leading end 21 of the flow passage 2 and a facing plane 43 there is, the more flow volume increases.

Next, experimental results regarding correspondence relation between external force and the flow volume are explained.

FIG. 4A shows results of the experiment on the tucked tube type sensing unit 4a. When air pressure at the air blowing unit 1 is 400 kPaG, i.e., 400 kPa higher than 1 atmosphere, the result shown by a curved line L1 is obtained. In FIG. 4A, the coordinates show force F[N] in a horizontal axis and the flow volume [L/min(nor)] of air flowing through the flow passage 2 Q in a vertical axis.

In view of this experiment, the significant change of the flow volume of air flowing through the flow passage 2 is obtained, if the external force is applied to the sensing unit 4a.

FIG. 4B shows results of the experiment on the slit type sensing unit 4b. When air pressure at the air blowing unit 1 is 50 kPaG, the result shown by a curved line L2 is obtained. Here the coordinates show force F[N] in a horizontal axis and the flow volume [L/min(nor)] of air flowing through the flow passage 2 Q in a vertical axis.

In view of this experiment, the significant change of the flow volume of air flowing through the flow passage 2 is obtained, if the external force is applied to the sensing unit 4b.

Next, experimental results regarding dynamic characteristics, i.e., temporal response performance of the flow volume variation to the external force are explained.

FIG. 5A shows results of the experiment on the tucked tube type sensing unit 4a. When the external force of about 20-25 N is several times applied to the sensing unit 4a by hands, the results shown by curved lines L3 and L4 are obtained. In FIG. 5A, the coordinates show a time in a horizontal axis and the force F and the flow volume of air flowing through the flow passage 2 Q in a vertical axis.

In view of this experiment, the temporal change in the flow volume of air flowing through the flow passage 2 follows the temporal change of the external force applied to the sensing unit 4a.

FIG. 5B shows results of the experiment on the slit type sensing unit 4b. When the external force of about 15-20 N is several times applied to the sensing unit 4a by hands, the results shown by curved lines L5 and L6 are obtained. In FIG. 5B, the coordinates show a time in a horizontal axis and the Force F and the flow volume of air flowing through the flow passage 2 Q in a vertical axis.

In view of this experiment, the temporal change in the flow volume of air flowing through the flow passage 2 follows the temporal change of the external force applied to the sensing unit 4b.

To evaluate dynamic characteristics of the sensing units 4a and 4b, these experiments achieved adequate response performance enough to apply to tasks with operation frequency less than 2-3 Hz such as a surgical operation.

Next, it is explained how computing device 5 processes operations using the force calculation system 100.

Firstly, the receiving unit 51 in the computing device 5 measures the flow volume of air flowing through the flow passage 2 (STEP 51).

More specifically, the receiving unit 51 receives measurement data of the flow volume of air flowing through the flow passage 2 from the flowmeter 3. Based on these measurement data, the processing unit 52 understands (measures) the flow volume of air flowing through the flow passage 2

Secondly, the processing unit 52 refers to the flow-volume-force correspondence relation information 531 stored in the memory unit 53 (STEP 3). Based on the flow-volume-force correspondence relation information 531 and the flow volume of air flowing through the flow passage 2 measured in STEP 51, the processing unit 52 calculates the strength of external force applied to the sensing unit 4.

In addition, when the force calculation system 100 is applied to a surgical robot, for example, feedback control in which a remote-operating medical doctor automatically obtains the force calculated by the STEP S3 may be executed.

Next, a processing unit 52 determines whether termination requirements are satisfied or not, wherein if this decision is "YES," then the process terminates, and wherein if this decision is "NO," then the process returns STEP 51.

In addition, termination requirements may be requirements not only satisfied by manual operations such as input operations but also satisfied by auto operations in which it is executed when there is no external force applied to the sensing unit 4 during a predetermined time.

According to the above embodiment for the force calculation system 100, since the sensing unit 4 changes the ease of flow of air flowing through the flow passage 2 by deforming when the external force is applied to the sensing unit 4. The external force applied to the sensing unit 4 is calculated by the sensing unit 4 arranged in the end portion of the flow passage 2 and the flow-volume-force correspondence relation information 531 stored in a memory unit 53.

Thus, it is possible to provide an undersized and inexpensive force calculation system, which calculates strength of force applied to a target area without an electrical device.

More specifically, a sensing unit 4 may be implemented by either a tucked tube type or a slit type.

In addition, as targeted detection is air volume, this is able to normally use under the electromagnetic environment such as the MRI device or explosion-proof environment such as a nuclear power plant.

Furthermore, as the sensing unit 4 has simple structure, it is possible to miniaturize it, to reduce parts count, and to achieve low cost and high durability.

To apply a surgical robot, as the end of a forceps has a diameter size of about 10 mm, it is possible to provide the sensing unit with the forceps.

In addition, in the environment that there is a permanently-installed air pressure source (the air blowing unit 1) such as a hospital, it is possible to compactify the whole system using the air blowing unit 1.

Furthermore it is possible to withstand high temperature sterilization treatment in about 125° C., since a sensing unit 4 is made of metal material such as stainless steel or aluminum. Thus this invention is suitable for applying to a medical field.

In addition, the system of this invention has high degrees of freedom of placement position, since the sensing unit 4 is connected to the flowmeter 3. More specifically, when using an optical fiber sensor, it is possible to disturb a movement of an articulated surgical robot due to rigidity of optical fibers with this robot.

On the other hand, in this embodiment, it is possible to use a low rigidity material for flow passage 2, thus it is possible to avoid this problem.

(Another Variation)

Next, another variation of a sensing unit 4 is explained.

As shown in FIG. 7A, a tucked tube type sensing unit 4c tucks three flow passages 2a, 2b and 2c at different positions in the aperture 41. In this case, for example, three flow passages 2a 2b and 2c have flowmeters 3 respectively, and the flowmeters 3 measure the flow volumes of the flow passages 2a, 2b and 2c respectively.

In this case, it is possible to calculate respectively the strength of external force based on the flow-volume-force correspondence relation information 531 stored in memory unit 53 and the flow volumes of air flowing through the flow passages 2a 2b and 2c. Thus, in the processing unit 52, it is possible to calculate the direction and the strength of external force applied to the sensing unit 4c based on this information. In addition, the system is able to have each flow-volume and force correspondence relation information corresponding to each of flow passages 2a, 2b and 2c.

In addition, as shown in FIG. 7B, in a slit type sensing unit 4d, the flow passages 2d, 2e and 2f are arranged at deferent positions. In this case, for example, three flow passages 2d, 2e and 2f have respectively flowmeters 3, and the flowmeters 3 measure the flow volumes of the flow passages 2d, 2e and 2f respectively.

In this case, it is possible to calculate respectively the strength of external force, based on the flow-volume-force correspondence relation information 531 stored in memory unit 53 and flow volumes of air flowing through the flow passages 2d 2e and 2f. And, in the processing unit 52, it is possible to calculate the direction and the strength of external force applied to the sensing unit 4c based on this information. In addition, the system is able to have each flow-volume and force correspondence relation information corresponding to each of flow passages 2d, 2e and 2f.

As mentioned above, according to another variation of a sensing unit, it is possible to calculate a direction and strength of force applied to one sensing unit, using a plurality of flow passages.

This invention is not limited to above embodiment. For example, material of the sensing unit 4 is not limited to the above embodiment. For example, it is possible to use another elastically deformable material such as titanium or plastic for the sensing unit 4.

In addition, as a sample of a coil spring is explained regarding the tucked tube type sensing unit 4, the sensing unit 4 is not limited to this structure. For example, it is possible to use another elastic body, which makes the width of the aperture change as a function of external force, such as a leaf spring or short spring.

In addition, as a sample of a computer is explained regarding the computing device 5, it is possible to use a LSI or an IC integrated the receiving unit 51, the receiving unit 52 and the processing unit 53 etc.

In addition, the shape of the sensing unit 4*b* is limited to a cylindrical shape. For example, it is possible to use another shape such as polygonal shape for the shape of the sensing unit 4*b*.

Furthermore it is possible to have two slit in the helical slit 42 and to close the opening in the bottom of the sensing unit 4*b*.

In addition, in this embodiment, the sensing unit 4 is explained when it is applied to the force pushing it. However, it is possible to use a sensing unit 4 applied to the force pulling it. In this case, along with above information shown in FIGS. 4A and 4B, it is necessary to obtain corresponding relationship between force and the flow volume under the condition that force is negative.

Regarding structures such as hardware or flowchart, it is possible to modify structures appropriately, if the scope of the present invention is not changed.

DESCRIPTION OF THE REFERENCE NUMERALS

1 air blowing unit
2 flow passage
3 flowmeter
4 sensing unit
5 computing device
21 end portion
22 middle portion
41 aperture
42 slit
43 facing plane
51 receiving unit
52 processing unit
53 memory unit
54 input unit
55 output unit
100 force calculation system
531 flow-volume-force correspondence relation information (in figures, abbreviated to "FF information")

The invention claimed is:

1. A force calculation system comprising:
   an air blowing unit for blowing air at a predetermined pressure,
   a flow passage connected to the air blowing unit for blowing air,
   a sensing unit arranged in an end portion of the flow passage on a side opposite to the air blowing unit wherein an ease of flow of air is changed by deformation due to an external force,
   a flowmeter measuring flow volume of air flowing through the flow passage,
   a memory unit for storing in advance information of a correspondence relation between a strength of an external force at the sensing unit and the flow volume of air flowing through the flow passage from the air blowing unit, and
   a processing unit for calculating the strength of the external force applied to the sensing unit based on the flow volume of air flowing through the flow passage as measured by the flowmeter and the information of the correspondence relation stored by the memory unit,
   wherein the sensing unit comprises an aperture tucking the flow passage down,
   the aperture is made of an elastic body wherein a width of the aperture is changed by the external force,
   the flow passage is made of elastically deformable tube, and the aperture made of the elastic body tucks down the end portion of the flow passage on the side opposite to the air blowing unit, and
   the flow volume of air flowing the tube is changed by a variation of the width of the aperture due to the external force applied to the elastic body.

2. A force calculation system according to claim 1,
   wherein the sensing unit comprises a slit of which a slit width changes as a function of the external force in a predetermined direction at the sensing unit,
   the flow passage is made of a tube, and the end portion of the flow passage on the side opposite to the air blowing unit is positioned at the slit, and
   if the external force in the predetermined direction is applied to the sensing unit, the flow volume of air flowing through the tube is changed by a variation of the slit width due to changing a distance between the end portion and its facing plane.

3. A force calculation system according to claim 1, further comprising a plurality of flow passages, and a plurality of flowmeters,
   wherein one end of each of the plurality of flow passages is directly or indirectly connected to the air blowing unit,
   an other end of each of passages is arranged at a different position in the sensing unit from each other,
   each of the plurality of flow passages has a flowmeter, and
   the processing unit calculating, respectively, the strength of the external force at the other end of each passage, based on each flow volume of air flowing through each of the plurality of the flow passages and the information of the correspondence relation stored by the memory unit.

* * * * *